April 24, 1962 R. DE LA TRAMERYE ET AL 3,031,023
MOTOR VEHICLE WITH ARTICULATED BODY
SECTIONS TO FACILITATE PARKING
Filed Oct. 9, 1959 5 Sheets-Sheet 1

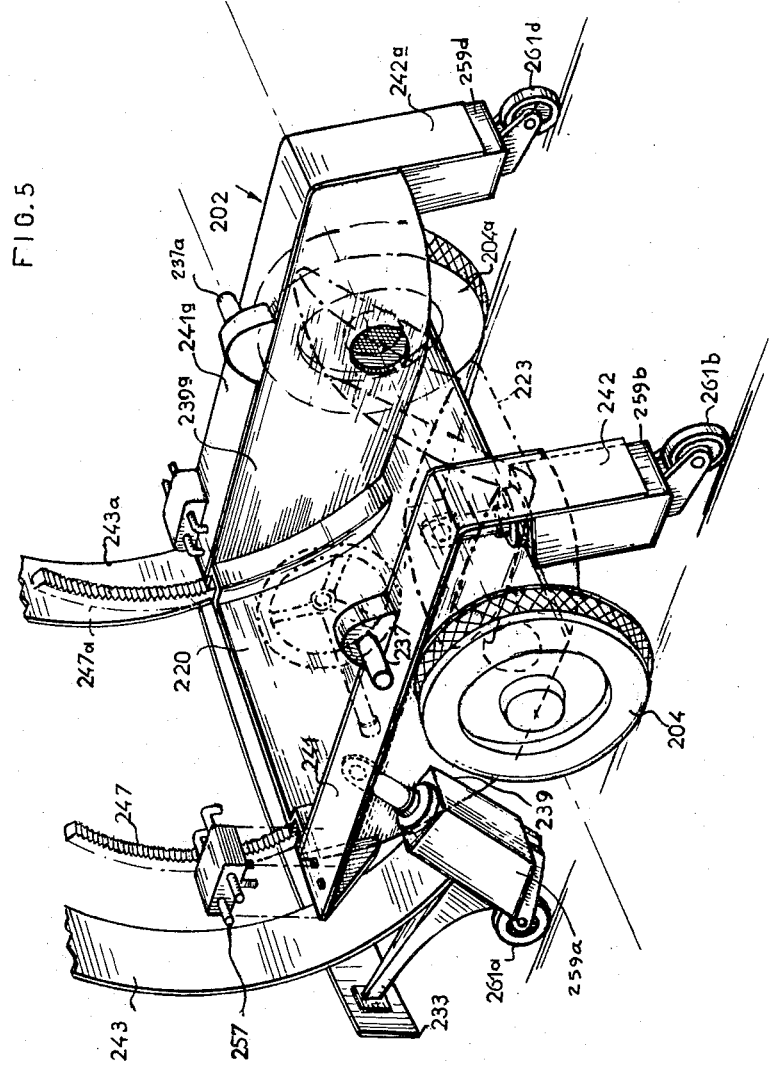

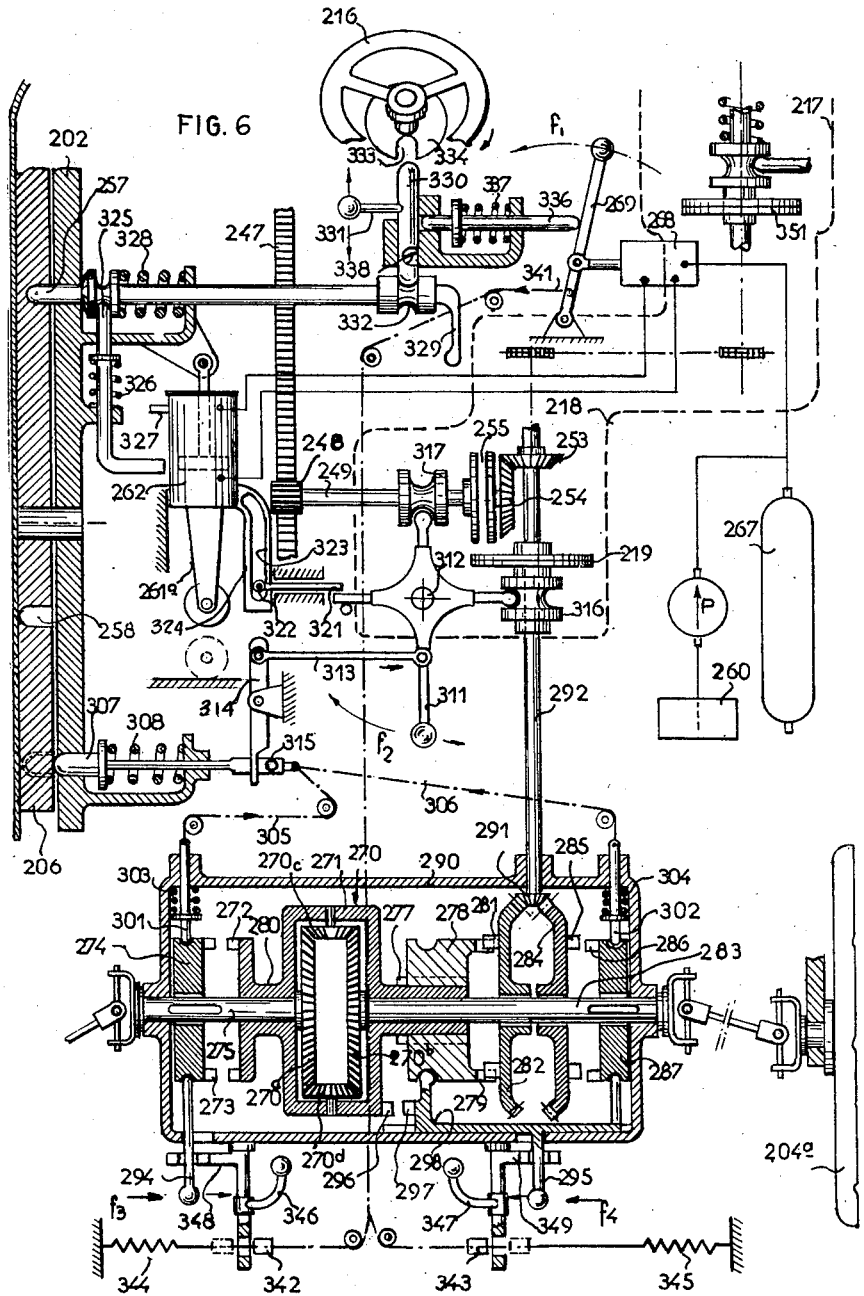

United States Patent Office 3,031,023
Patented Apr. 24, 1962

3,031,023
MOTOR VEHICLE WITH ARTICULATED BODY SECTIONS TO FACILITATE PARKING
Raymond de la Tramerye, 6 Rue Quentin Bauchard, Paris, France, and Jacques Hébert, Fere-en-Tardenois, Aisne, France
Filed Oct. 9, 1959, Ser. No. 845,470
Claims priority, application France Aug. 19, 1954
5 Claims. (Cl. 180—1)

This is a continuation-in-part of our copending application Ser. No. 515,437 filed on June 14, 1955, now Patent No. 2,915,132 dated December 1, 1959.

In the aforesaid patent, we have described a road vehicle with a body having a rear portion which may be pivoted about a horizontal transverse axis above the front portion of the car body for parking purposes.

The main object of the present invention is to provide a road vehicle such as a motor car which distinguishes from the road vehicle disclosed in our aforesaid patent in that not a section only of the vehicle body but the entire vehicle body may be pivoted about a horizontal transverse axis, so as to permit a ready and easy parking of the vehicle.

A further object of the invention is to provide a vehicle structure including a driver's compartment and means permitting to pivot the body of the vehicle about the transverse axis of the driver's compartment between a horizontal running position and a vertical position.

Still a further object is to provide a road vehicle the entire body of which is mounted for pivoting motion about a transverse axis, the construction of said road vehicle being such that, when the entire body has been pivoted to vertical position, the vehicle may be moved about in every direction for parking purposes, including turning in its own length.

Other objects and advantages of the invention will be apparent from the following detailed description, together with the accompanying drawings, submitted for the purpose of illustration only and not intended to define the scope of the invention, reference being had for that purpose to the subjoined claims.

In these drawings:

FIG. 3 is a fragmentary longitudinal section made on line 7—7 of FIG. 2;

FIG. 5 is a perspective view of the bed structure alone of the vehicle of FIGS. 1 to 4, and FIG. 6 is a diagrammatic sketch showing the operation of the control mechanism provided for the control of the vehicle shown in FIGS. 1 to 4.

Figure 1:
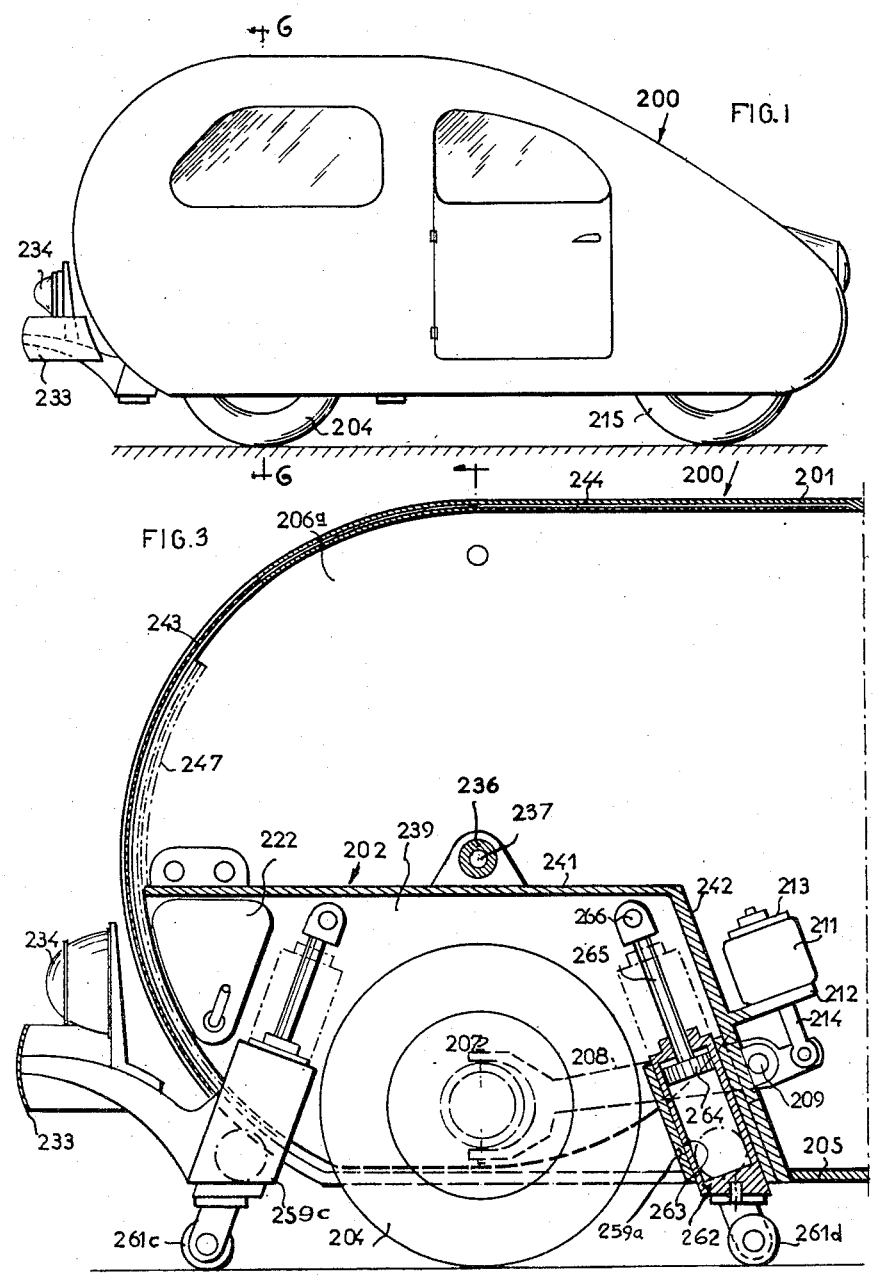
FIG. 1 is a side elevational view of an embodiment of a vehicle according to the invention shown in a position ready to be raised for facilitating parking.
Figure 2:
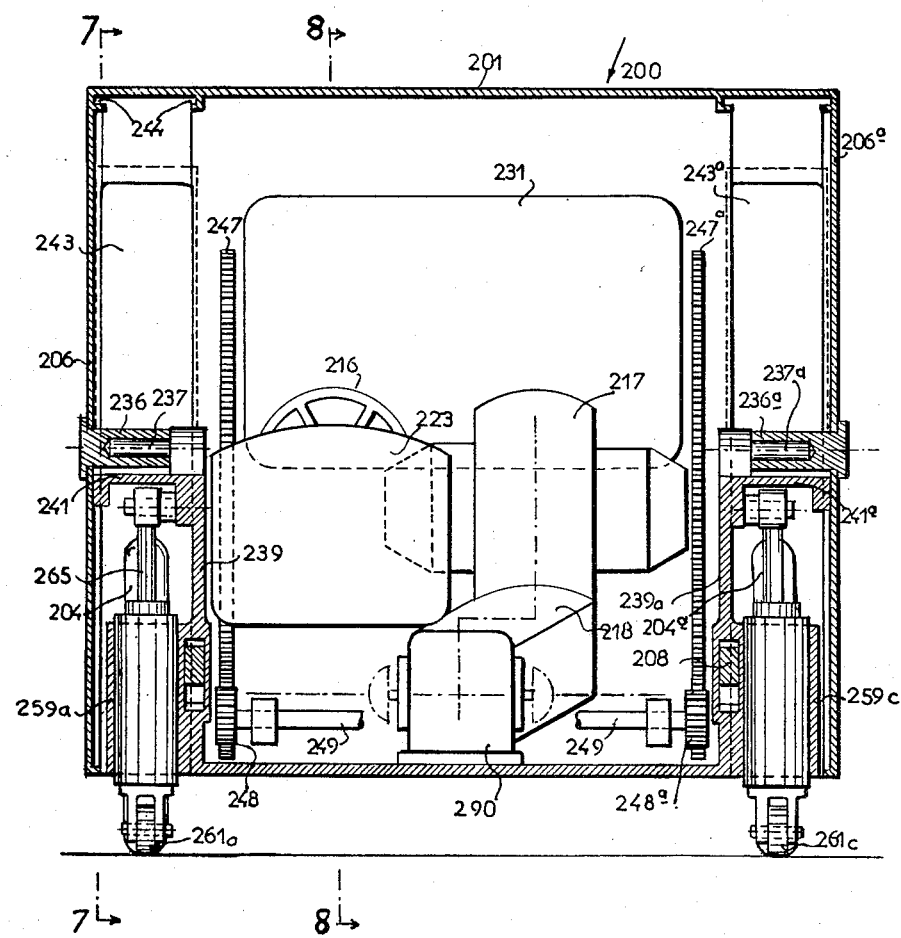
FIG. 2 is, to a larger scale, a transverse section made substantially on line 6—6 of FIG. 1.

FIGS. 1 to 6 show a road vehicle according to the invention. This vehicle includes a body 200 having a top wall 201, a bottom wall 205, two lateral walls 206, 206a, and a front wall 210 semi-cylindrical in shape and provided with a wind-shield 231, a motor 217, a fuel tank 222, a pair of steerable front wheels 204, 204a, powered by the motor, a pair of rear supporting wheels one of which only is visible in FIG. 1 at 215, retractable wheels 261a, 261b, 261c, 261d, a bumper 233 carrying head-lights one of which is shown at 234 in FIG. 3.

In the normal or running position, the vehicle rests on the front wheels 204, 204a, and on the rear wheels such as 215, in the same manner as a conventional car.

In the front portion of the vehicle body 200 is mounted a bed-structure 202 which defines a compartment for the driver and which supports the motor 217. The bed-structure 202 comprises a substantially arcuate bottom wall 220 (FIG. 5) with a flattened horizontal middle portion serving as a floor and two vertical lateral walls 239, 239a formed, at their upper edges, with horizontal flanges 241, 241a, turned outwardly and merging into rear extensions 242, 242a turned downwardly.

Each of the front wheels 204, 204a, is mounted for pivotal steering movement about a vertical pivot pin 207 (FIG. 3) at one end of a lever 208 the other end of which is pivotally connected to the bed-structure 202 by means of a horizontal transverse pin 209.

The front suspension means are constituted by rubber blocks 211, the lower face of which rests upon a bracket 212 of the bed-structure 202 while a pressure plate 213 resting upon the top face of the rubber blocks 211 is operatively connected, by a link 214, to the lever 208. Due to this arrangement, the bed-structure 202 is entirely supported by the front wheels 204, 204a.

The steering wheel 216 is operatively connected to the front wheels 204, 204a by means of a conventional transmission which need not be described here.

The motor 217 has a drive connection with the front wheels 204, 204a, which connection includes a speedbox 218 (FIG. 4), a clutch 219 and a differential gear 270 of a particular design which will be described hereinafter, particularly with reference to FIG. 6.

To the bed-structure 202, is secured the driver's seat 223; when the vehicle is in horizontal normal running position, the driver has an easy access to his seat 223 through a lateral door 225, and when the vehicle is in vertical standing position (FIG. 4), he has access through a longitudinal slidable door 226 mounted in the bottom of wall 205 of the body 200.

The top wall 201 of the body is provided with a wind-shield 232 which provides a field of vision for the driver when the vehicle is in its raised parking position.

The front portion of the body is pivotally connected to the bed-structure 202 by means of two sleeves 236, 236a (FIG. 2) respectively secured to the lateral walls 206, 206a, of the body, so as to extend along the axis of said front portion, the sleeves 236, 236a being engaged by pivoting trunnions 237, 237a mounted on the corresponding horizontal flanges 241, 241a of the bed-structure 202, so as to extend in the axis of the arcuate portion of the bottom wall 220 of the bed-structure. The pivotal connections 236, 237 and 236a, 237a permit the whole body with the rear wheels 215 to swing about the axis of the bed-structure relative to the latter (FIGS. 2 to 5).

The outer sides of the lateral walls 239, 239a of the bed-structure 202, and the inner sides of the lateral walls 206, 206a of the body 200 form, together with the flanges 241, 241a, 242 and 242a, a space adapted to receive the front wheels 204, 204a.

Two flexible strips 243, 243a having their lower ends secured to the bed-structure are adapted to slide in guideways 244 of the body 201 upon said body being pivoted relative to the bed-structure.

The pivotal movement of the body 200 is ensured by means of a mechanism which includes two arcuate internal toothed racks 247, 247a secured to the front portion of the body coaxially with respect to the horizontal pivoting axis of the trunnions 237, 237a and respectively in mesh with toothed pinions 248, 248a provided on a shaft 249 rotatably mounted on the bed-structure 202. The shaft 249 is driven by the motor 217 through a transmission which includes bevel gears 251, 252 and 253, 254 and a clutch device 255 (FIG. 4).

The body may be releasably locked in the horizontal or in the vertical position by means of rods 257 carried by the bed-structure and adapted to engage corresponding recesses such as 258 (FIG. 6) formed in the lateral walls 206, 206a of the body.

Figure 4:
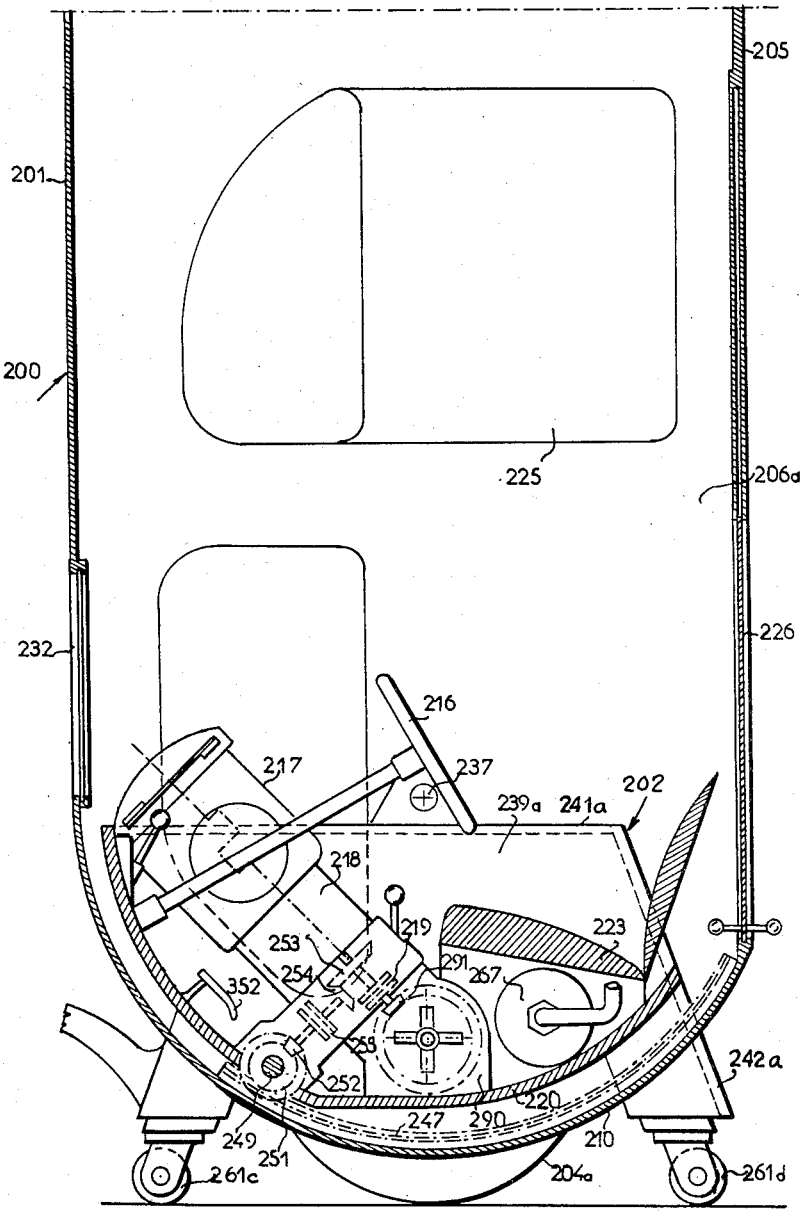
FIG. 4 is a fragmentary section made substantially on line 8—8 of FIG. 2, the vehicle, however, being supported in raised parking position.

When the body 200 is in raised position as in FIG. 4, the whole vehicle is supported partly by the front wheels 204, 204a and partly by the retractable caster wheels 261a, 261b, 261c, 261d. Each retractable caster wheel is mounted at the lower end of a fluid pressure cylinder 262 (FIG. 3) which is slidably mounted in a bore 263 of a respective supporting member 259a, 259b, 259c, 259d secured to the bed-structure 202, and the stationary piston 264 of which has a rod 265 the upper end of which is secured to the bed-structure 202 by means of a pin 266.

The four cylinders such as 262 are actuated by a pressure-fluid supplied by a hydropneumatic accumulator 267 (FIGS. 4 and 6) which may be loaded under the control of a distributor valve 268 including a manually operated handle 269. A pump P connected to a reservoir 260 delivers fluid under pressure to the accumulator 267.

The general arrangement is such that when the body 200 is in horizontal normal running position, the four retractable wheels 261a, 261b, 261c, 261d are in their retracted position, whereas, when the body 200 is in upright parking position, the four retractable wheels are brought into engagement with the ground and both front wheels 204, 204a, also bear on the ground because they serve for moving the upright vehicle in any desired direction for parking purposes.

To this aim, the front wheels 204, 204a, may be rotated either in the same rotational direction or in opposite rotational directions.

The front wheel drive comprises a special mechanism mounted in a casing 290, including a differential gear 270 mounted in a cage 271 (see FIG. 6), and having two sun wheels 270a, 270b and two planet pinions 270c, 270d. The cage 271 has an axial extension 280 provided with clutch teeth 272 adapted to engage clutch teeth 273 of a plate 274 mounted to rotate with a live axle 275 which is connected to one of the front wheels. The differential cage 271 has another axial splined extension 277 on which is slidably mounted a sleeve 278 which also has teeth 279 adapted to engage teeth 281 of a bevel wheel 282 loosely mounted on another live axle 283 which has a driving connection with the other front wheel 204a. Another bevel wheel 284 has teeth 285 engageable with teeth 286 of a second plate 287 which is secured to the live axle 283. Both bevel wheels 282 and 284 are in mesh with a bevel pinion 291 mounted on an input shaft 292 adapted to be driven from the gearbox 218 through the clutch 219 already referred to hereinabove.

The plate 274 may be shifted into or out of engagement with the differential cage 271 by means of a hand lever 294 and the other plate 287 may be brought into or out of engagement with the bevel wheel 284 while the sleeve 278 is brought out of or into engagement with the bevel wheel 282, by means of a member 298 slidably mounted in the casing 290 and provided with a hand-lever 295. Furthermore, the differential cage 271 also has teeth 296 engageable with corresponding teeth 297 of the member 298, in order to lock the differential cage 271 against rotation.

Both plates 274 and 287 may be locked in their axial position represented which corresponds to normal running condition, by means of bolts 301 and 302, respectively, urged toward locking position by springs 303, 304. Both bolts 301 and 302 are connected by means of cables 305, 306 to another bolt 307 adapted to lock the body in vertical parking position with respect to the bed-structure 202. This bolt 307 is urged to locking position by a spring 308.

The locking bolt 307 may be released by means of a handlever 311 pivoted at 312 and connected by a link 313 to a lever 314 adapted to engage a pin 315 secured to the bolt 307.

The handlever 311 may also control both clutches 219 and 255 hereinabove referred to, as diagrammatically represented, by the sleeves 316 and 317 in such a manner that when any one of these two clutches is engaged, the other is released.

When the retractable wheels such as 261a are retracted, the hand-lever 311 is locked against clockwise pivoting movement, by a bolt 321 which carries a cam follower 322 engaged in a slot 323 of a cam 324 secured to the cylinder 262 which carries the retractable wheel 261a.

A bolt 325 loaded by a spring 326 temporarily prevents the body-locking rod 257 from being released. When the retractable wheel 261a reaches its ground engaging position, a finger 327 carried by the cylinder 262 engages a bent end portion of the bolt 325 and causes the latter to be disengaged from the body-locking rod 257.

The body-locking rod 257 is urged to locking position by a spring 328 and it may be released by means of a handle 329, provided the front wheels 204, 204a of the car are oriented straight ahead. For this purpose, a bolt 330 provided with a handle 331 may engage either a recess 332 of the rod 257 or a recess 333 of a member 334 moving in unison with the steering wheel 216. Another bolt 336 is urged by a spring 337 into a recess 338 of the bolt 330 in order to prevent manual actuation of the distributor control lever 269 toward the left (in FIG. 6) unless the body-locking rod 257 is disengaged.

The distributor control lever 269 also controls, by means of a cable 341, locking devices 342, 343 urged by springs 344, 345 and adapted either to lock or to release manual handles 346, 347 respectively provided with forks 348, 349 adapted to temporarily block the control handles 294 and 295 of the driving wheel mechanism. The diagram of FIG. 6 also shows the conventional clutch 351 inserted between the engine 217 and the speed box 218 and operated through a pedal 352 (FIG. 4).

For normal running of the car, the various members assume the positions represented in FIG. 6. The power from the engine 217 is transmitted to the front wheels 204, 204a through the following drive: clutch 351, speed box 218, clutch 219, input shaft 292, bevel gearing 291–282, teeth 281, sleeve 278, teeth 279, and in a conventional manner through the differential gear 270, and live axles 275, 283. Forward and backward drives are selectively obtained as usual by means of the gearbox 218.

When it is desired to raise the vehicle body in upright position, the front wheels first must be oriented straight ahead, the handle 331 is moved in the direction which releases the bolt 330 from the groove 332, this movement being possible since the recess 333 is in register with the bolt 330, and the distributor controlling lever 269 is pivoted in the direction of the arrow f1, this movement being possible since the recess 338 is in register with the bolt 336. The movement of the distributor controlling lever 269 causes actuation of the hydraulic jacks such as 262 downwardly and, therefore, downward movement of the retractable wheels 261a, 261b, 261c, 261d. Upon the latter engaging the ground, the stop 327 disengages the bolt 325 from the rod 257. It is then possible to pull the handle 329 in order to release the body 200.

Downward movement of the jack cylinder 262 also causes retraction of the bolt 321 and, therefore, release of the hand-lever 311, which has now to be turned in the direction of the arrow f2. Such movement causes disengagement of the clutch 219 and engagement of the clutch 255. At the same time, the bolt 307 is retracted against the action of the spring 308 through the pin 315, lever 314 and link 313. By means of the main clutch 351, the speed box 218, the bevel gearing 253–254, the clutch 255, the shaft 249 and the pinion and rack drive 248–248a, 247–247a, the body may be pivoted upwardly by the engine about the trunnions 237–237a of the bed-structure. When the car body assumes its raised position, the recess 258 is in register with the bolt 307 so that, upon pivoting the hand-lever 311 back in the reverse direction, the bolt 307 engages the recess 258 and locks the body relative to the bed-structure in raised position.

For moving the car in its vertical position for parking purposes, use is made of the front wheels which may be driven by the car engine, either in the same direction or in reverse directions with respect to each other. It should be noted that the four retractable wheels 261a, 261b, 261c, 261d, and the two main front wheels 204, 204a bear simultaneously upon the ground when the body is in the upright position. Since the retractable caster wheels are self-orientable, and since the main front wheels are locked in straight ahead direction and may be powered in any rotational direction, it is clear that the vehicle may be moved in any direction on the ground. Thus, when the front wheels are powered simultaneously in forward or in backward direction, the car moves correspondingly along a rectilinear path either forward or backward. If the front wheels are rotated in reverse rotational directions one relative to the other, then the vehicle pivots on the ground about a vertical axis.

When it is desired to rotate both front wheels in forward direction, the gear box 218 is set to forward position and the hand-lever 294 is moved in the direction of the narrow f3 thus engaging the teeth 273 of the plate 274 with the teeth 272 of the differential cage 271. This cage, therefore, and all the gears of the differential 270 rotate as a whole together with both live axles 275 and 283. These shafts, therefore, may be driven simultaneously at the same rotational speed by the car engine through the sleeve 278 and bevel gearing 282–291. The input shaft 292 is driven in the same manner as in normal running.

In order to obtain the backward drive, it suffices to set the speed box in reverse, the positions of the other hand-levers remaining unchanged.

When it is desired to rotate one front wheel about its axle in one direction and the other front wheel in the opposite direction, the hand-lever 294 has to be set in the position represented in FIG. 6 and the hand-lever 295 has to be shifted in the direction of the arrow f4 which causes not only engagement of the teeth 297 of the member 298 with the teeth 296 of the differential cage 271 so as to lock said cage against rotation, but also engagement of the teeth 286 of the plate 287 and the teeth 285 of the bevel wheel 284, and disengagement of the teeth 279 of the sleeve 278 from the teeth 281 of the bevel wheel 282. As a result, the power input shaft 292 rotates the bevel gearing 291—284, the plate 287 and the live axle 283 in a predetermined rotational direction, while, in turn, said live axle 283 drives the other live axle 275 in the reverse direction through the gears of the differential 270 whose cage 271 is held immovable as hereinabove indicated. The bevel wheel 282 rotates idle on the live axle 283 in reverse direction with respect thereto while the plate 274 rotates together with the axle 275.

If it is desired to rotate the wheels in the reverse direction, this may be done by setting the speed box accordingly.

It will be noted that due to the locking nuts 342, 343 operatively connected to the cable 341, the hand-levers 346, 347 and, therefore, the hand-levers 294, 295 cannot be moved unless the distributor controlling lever 269 assumes one or the other of its end positions. Furthermore, the two plates 274 and 287 may be shifted inwardly, for parking manoeuvers, but only after the bolts 301, 302 are disengaged following the engagement of the bolt 307 into the recess 258 of the car body in raised position.

For lowering the body to horizontal normal running position, the hand-lever 311 is pivoted in the direction of the arrow f2. This movement causes disengagement of the body locking bolt 307, disengagement of the clutch 219, and engagement of clutch 255. The speed box 218 is set to reverse and the pinion 248 rotates in the reverse direction, causing the body to pivot as desired. Then the body is locked by the spring rod 257 and it becomes again possible to turn the steering wheel 216.

In the bed-structure is mounted a device (not shown) adapted to indicate to the driver the inclination of the road in all direction. If the road inclination reaches a value beyond a predetermined safe limit value, then the driver is aware that any attempt to raise the body vehicle for parking under such conditions would be dangerous. The indicating device may comprise for instance, two spirit levels arranged at right angles to each other.

What we claim is:

1. In a motor car having a body supported by a pair of rear wheels, a bed structure having a bottom wall and two opposite upstanding lateral walls positioned internally of the front portion of said body and supported by a pair of steerable front driving wheels, said front portion of the body being in turn supported by said bed structure for pivotal movement about a transverse axis, two pairs of longitudinally spaced extensible and retractable auxiliary wheels, each pair connected to one of said lateral walls, respectively, of the bed structure with one of said front wheels positioned therebetween, first power means carried by said bed structure and operatively connected to said body to pivot the latter about said transverse axis from a horizontal position of said body in which said rear wheels rest on the ground to an upright position, and second power means carried by said bed structure and adapted to extend said auxiliary wheels into engagement with the ground, whereby said bed structure will be supported by said auxiliary wheels at four additional points of the bed structure so as to support said body when the latter is in said upright position thereof.

2. A motor car according to claim 1, in which the front end wall of said body front end portion is of substantially semi-circular longitudinal section in a vertical plane, and in which said bottom wall of the internal bed structure is curved so as to extend substantially concentrically with said front end wall, the pivot point of said body about said bed structure lying at the centre of both said front end wall of the body and said bottom wall of the bed structure.

3. A motor car according to claim 1, wherein means are provided to rotate said front wheels simultaneously in opposite directions.

4. A motor car according to claim 1, in which said first power means constitute the driving means for said front driving wheels.

5. A motor car according to claim 1, in which said internal bed structure constitutes the driver's compartment of the motor car and includes seating means for the driver secured to the bed structure.

References Cited in the file of this patent
UNITED STATES PATENTS
1,594,687     Pelton _____ Aug. 3, 1926